United States Patent [19]
Leusner et al.

[11] Patent Number: 4,696,826
[45] Date of Patent: Sep. 29, 1987

[54] PROCESS FOR MANUFACTURE OF EMULSIONS CONTAINING SOY PROTEIN

[75] Inventors: Steven J. Leusner, Lakewood; Barbara C. Raphael, Princeton; William G. Swanhart, Jr., Plainsboro, all of N.J.

[73] Assignee: General Foods Corporation, White Plains, N.Y.

[21] Appl. No.: 864,176

[22] Filed: May 16, 1986

[51] Int. Cl.⁴ .................... A23C 11/08; A23L 1/19; A23G 9/00
[52] U.S. Cl. .................................. 426/565; 426/570; 426/613
[58] Field of Search ............... 426/570, 565, 566, 567, 426/656, 613

[56] References Cited

U.S. PATENT DOCUMENTS

| | | | |
|---|---|---|---|
| 4,346,122 | 8/1982 | Orthoefer et al. | 426/570 |
| 4,451,492 | 5/1984 | Dill et al. | 426/570 |
| 4,461,777 | 7/1984 | Murase et al. | 426/570 |

Primary Examiner—Jeanette Hunter
Attorney, Agent, or Firm—Barbara Toop D'Avanzo; Thomas R. Savoie; Daniel J. Donovan

[57] ABSTRACT

A process for preparing an emulsion containing soy protein and which contains no milk fat, according to which the soy protein material, is initially dispersed in a non-milk fat phase instead of a water phase. The process may further include the addition of phosphates in an amount effective to impact the stability of the emulsion.

9 Claims, No Drawings

PROCESS FOR MANUFACTURE OF EMULSIONS CONTAINING SOY PROTEIN

TECHNICAL FIELD

This invention relates to a process for preparing an emulsion, such as that used for frozen whipped toppings. More particularly, it relates to an improved process for preparing frozen whipped emulsions which contain no milk fat, but contain soy protein material and phosphates.

BACKGROUND ART

Processes for preparing frozen whipped emulsions, such as frozen whipped toppings, are known in the art. Such compositions are known to comprise fats, proteins, emulsifiers, stabilizers and water such as described in U.S. Pat. No. 3,431,117 to Lorant. According to this patent, the compositions are blended and homogenized at pressures of at least 6,000 psi then cooled, whipped and frozen. U.S. Pat. No. 4,478,867 to obel et al. discloses a process for whipping a homogenized emulsion. According to the patent, the emulsion is aerated in a continuous mixer, the emulsion is then pressure reduced in a gradual manner, whipped under pressure; thereafter the whipped emulsion is reduced to atmospheric pressure. In U.S. Pat. No. 4,411,926 to Trumbetas, a process is disclosed for making a protein stabilizer for use in an edible frozen foamed emulsion in which the proteins are modified by co-drying the protein with a selected emulsifier.

SUMMARY OF THE INVENTION

In the present invention, a process is taught which produces a soy protein-containing emulsion that has improved uniformity and a more desirable viscosity. Soy protein material is a known, lowcost, partial replacement for sodium caseinate which is the conventional protein component of frozen foamed emulsions. The process requires the dispersion of a protein material, such as a soy protein material, to a non-milk fat phase. It has been found that addition of the protein to the fat phase has a number of beneficial results as compared to its addition to the water phase. It reduces the number of poorly dispersed lumps or "fisheyes" which need to be filtered or screened out prior to homogenizing. In addition, a lower viscosity, 40-60 Brookfield units at 20 rpms will be had and a resultant smaller average fat particle size of 0.3-0.4 microns, instead of the previous average of 0.4-0.5 microns. The result of all this being a more uniform emulsion.

This invention also discloses the addition of phosphates to the soy protein containing emulsion. Although the addition of soy protein in accordance with this invention, yields a product with improved uniformity and more desirable viscosity, an unfavorable characteristic also results-poor freeze/thaw stability. The addition of phosphates improves the performance of the soy protein material to a level equal to that of sodium caseinate.

DETAILED DESCRIPTION

Prior to this invention, frozen whipped emulsions which contained soy protein as a partial replacement for sodium caseinate were typically made according to a particular batching order. As is known in the art, the order of ingredient addition has a large effect on the quality, stability and processability of an emulsion. The order of ingredients previously utilized was water, soy protein, fat, color, sodium caseinate, sugar, stablizers and flavors. This batching order produced a suitable emulsion, once homogenized, but had a number of problems associated with it. In particular, a significant amount of the soy protein material was trapped as poorly dispersed lumps or "fisheyes". It was necessary to filter out these lumps from the emulsion prior to homogenizing, by use of an in-line screen. In addition, the viscosity of the emulsion upon cooling was at a relatively high level with an average of more than 80 Brookfield units at 20 rpms (spindle H1, 40° F.). This high level viscosity hindered the formation of uniform fat globules with the desired size. The average size of fat globules from this process was 0.4-0.5 microns, compared to the average uniform size of 0.3-0.4 microns, which can be obtained by use of the presently disclosed process. The lower average fat globule size is a result of a lower viscosity, 40-60 Brookfield units at 20 rpms, preferably about 50 Brookfield units at 20 rpms (spindle H1, 40° F.), and provides a more uniform emulsion. It is also a result of a more efficient migration to the interface.

As is known, the proteins will migrate to the interface, in this case, between the fat and the water. In an emulsion of the present type, fat and water are in a ratio of from about 1:2 to about 1:4. If the protein is dispersed in the water, it may have up to four times as far to travel to reach the interface, compared to its dispersion in the fat. It is believed that the smaller distance travelled by the protein, when dispersed in the fat, contributes to the smaller fat globule size, and the resultant, more uniform emulsion.

The new process provides for the addition of the soy protein material at a different stage in the batching order then the order previously utilized. The soy protein material is dispersed directly into the fat. In this process, the fat is limited to non-milk fats. The entire process comprises dispersing the soy protein material in the non-milk fat, to which any desired fat-soluble color may have been previously added. The remaining ingredients are then blended with the soy-fat dispersion in the following order: water, emulsifiers, sodium caseinate, sugars, stabilizers and flavors. The resultant blend is then homogenized so as to form an emulsion. The emulsion is then whipped and aerated, and then frozen. The processing of the emulsion in this manner, and in particular the dispersion of the soy protein material in the fat phase instead of in the aqueous phase as previously done, provides for a dispersion with fewer lumps or fisheyes. The resultant emulsion, after being homogenized, passes much more efficiently through the plate heat exchanger.

In both batching orders, the color was shown to be added directly to the fat. As would be known to one skilled in the art, the point of addition of the color would depend upon the color itself. If it is a fat-soluble color, then, in the invention set forth herein, it would be blended with the fat, and the soy protein material would be dispersed in the fat/color blend. If the color was a water soluble color, the color would be added to the blend subsequent to the addition of water. In that case, the soy protein material would be added to the fat without color.

Different forms of soy protein material may be used, such as a soy protein isolate, or a modified soy protein; a suitable modified soy protein could be a spray-dried blend comprised of soy protein isolate, sucrose and Polysorbate-60, examples of such being set forth in U.S. Pat. No. 4,411,926 to Trumbetas et al. Such a blend is further described in the aforementioned patent to Trumbetas, which is hereby incorporated by reference.

One of the reasons a soy protein material is used in a frozen whipped emulsion is as a cheaper substitute for sodium caseinate. Soy protein is used only as a partial replacement and tends to yield products of poorer freeze/thaw stability than those products where none of the sodium caseinate is replaced. According to the present invention, this negative characteristic of soy protein material can be overcome by the addition of phosphates to the ingredients at a level effective to impact the stability of the emulsion. On a percent by weight of the total emulsion, this would be within the range of 0.01 to 0.1 percent, with the optimal being about 0.04 percent. This results in a product with a freeze/thaw stability equal to a product which does not replace any of the sodium caseinate with soy protein material. Certain phosphates have been found to work particularly well. They are sodium hexametaphosphate, monosodium phosphate, monopotassium phosphate, disodium phosphate, dipotassium phosphate, tetrasodium pyrophosphate tetrapostassium pyrophosphate and combinations thereof. The phosphates would be added after the water so that the batching order reads: fat, soy protein, water, phosphates, emulsifiers, sodium caseinate, sugars, stabilizers and flavors. The following examples are illustratory and not meant to be limiting in any manner.

EXAMPLE

Two batches of an emulsion were prepared using the same formulation, but different processing steps. The formulation used was:

| Ingredient | % by weight |
| --- | --- |
| Water | 47.16 |
| Hydrogenated Coconut and Palm Kernel Oil | 20.00 |
| Sugar | 4.40 |
| Corn Syrup (42 D.E., 80% solids) | 16.77 |
| High Fructose Corn Syrup (42% Fructose, 71% solids) | 8.14 |
| Sodium Caseinate | 0.50 |
| Dextrose | 0.86 |
| Flavorings and Colors | 0.36 |
| Stabilizers | 0.48 |
| Emulsifiers | 0.14 |
| Modified Soy Protein | 1.10 |
| Disodium Phosphate | 0.04 |
| Tetrasodium Pyrophosphate | 0.04 |
| | 99.99 |

The first batch was processed by dispersing the soy in water. The ingredients were then blended together in the following order: water, phosphates, soy, fat, colors, emulsifiers, dry ingredients, stabilizers, syrups and flavors. The blend was pasturized at 155° F. for 15 minutes. The cold viscosity of the resulting emulsion was 74 at 20 rpms (spindle H1, 40° F.).

The second batch was prepared by dispersing the soy in the fat. The colors and fat were pre-blended, and then the soy was dispersed in that blend. The remaining ingredients were blended in the following order: water, phosphates, emulsifiers, dry ingredients, stabilizers, syrups and flavors. The colored soy fat dispersion was added to the blend to form an emulsion. The resultant emulsion was then pasturized at 155° F. for 15 minutes. The cold viscosity was 56 at 20 rpms (spindle H1, 40° F.).

What is claimed is:

1. A process for preparing a soy protein-containing emulsion having improved uniformity and more desirable viscosity, comprising the steps of:
   (a) dispersing a soy protein material in a non-milk fat;
   (b) blending said dispersion with emulsifiers, stabilizers, sodium caseinate and water; and
   (c) homogenizing said blend so as to form an emulsion.

2. The process as set forth in claim 1 which further comprises adding phosphates in the amount of 0.01–0.10 percent by weight of the total emulsion.

3. The process as set forth in claim 2 wherein the phosphate is chosen from the group consisting of sodium hexametaphosphate, monosodium phosphate, monopotassium phosphate, disodium phosphate, dipotassium phosphate, tetrasodium pyrophosphate, tetrapotassium pyrophosphate and combinations thereof.

4. The emulsion according to the process of claim 1.

5. The emulsion according to the process of claim 2.

6. A frozen whipped emulsion prepared according to the process of claim 1, which further comprises whipping, aerating and freezing the emulsion.

7. A frozen whipped emulsion prepared according to the process of claim 2, which further comprises whipping, aerating and freezing the emulsion.

8. The process as set forth in claim 1, wherein the soy protein material is in a modified form prior to being incorporated therein.

9. The process as set forth in claim 1 wherein the viscosity of the mixture of step (b) has a viscosity of 40–60 Brookfield units at 20 rpms (spindle H1, 40° F.).

* * * * *